United States Patent
Zula et al.

(10) Patent No.: US 11,370,399 B2
(45) Date of Patent: Jun. 28, 2022

(54) OPERATOR INTERFACE FOR A VEHICLE WHEEL BRAKE CONTROL SYSTEM

(71) Applicant: Bendix Commercial Vehicle Systems LLC, Elyria, OH (US)

(72) Inventors: Daniel P. Zula, North Ridgeville, OH (US); Nianqing Zhou, Avon, OH (US); Vadim V. Nikiforov, Elyria, OH (US); Rajkumar Senthilkumar, Grand Blanc, MI (US); Péter Gyetván, Gya (HU)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 444 days.

(21) Appl. No.: 16/566,982

(22) Filed: Sep. 11, 2019

(65) Prior Publication Data
US 2021/0070260 A1 Mar. 11, 2021

(51) Int. Cl.
*G05G 1/04* (2006.01)
*B60Q 9/00* (2006.01)
*B60T 8/171* (2006.01)
*B60T 7/08* (2006.01)

(52) U.S. Cl.
CPC .............. *B60T 7/085* (2013.01); *B60Q 9/00* (2013.01); *B60T 8/171* (2013.01); *G05G 1/04* (2013.01); *B60T 2270/82* (2013.01)

(58) Field of Classification Search
CPC ...... B60T 7/085; B60T 8/171; B60T 2270/82; B60Q 9/00; G05G 1/04
See application file for complete search history.

(56) References Cited

U.S. PATENT DOCUMENTS

2018/0086322 A1 3/2018 Zula et al.
2019/0126753 A1 5/2019 Kulkarni et al.

*Primary Examiner* — Mathew Franklin Gordon
(74) *Attorney, Agent, or Firm* — Reising Ethington P.C.

(57) ABSTRACT

An operator interface for a wheel brake control system in a vehicle includes a handle configured for coupling to a fixed reference frame in the vehicle. The handle is configured for movement relative to the fixed reference frame about a pivot axis between a neutral position and one or more input positions. One or more inertial sensors are disposed within the handle. Each sensor is configured to generate an inertial measurement signal indicative of a value of a corresponding inertial measurement associated with movement of the handle and the sensor between the neutral position and the input positions. A controller disposed within the handle is configured to generate an operator command signal responsive to the inertial measurement signals. The operator command signal is configured to cause application or release of a brake in the vehicle.

26 Claims, 6 Drawing Sheets

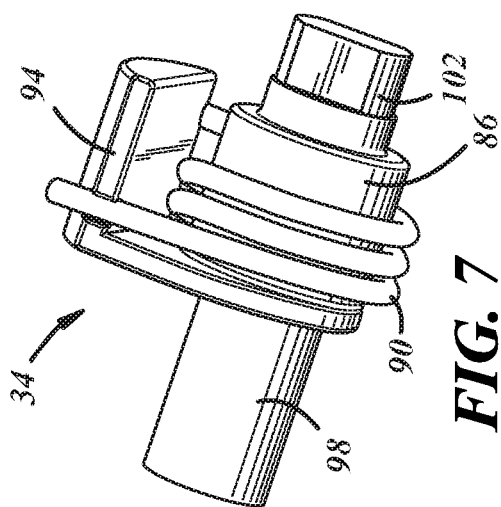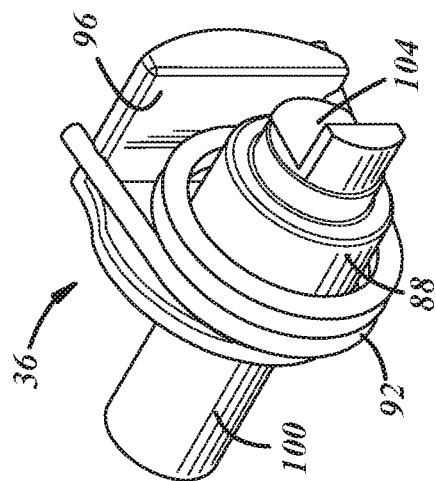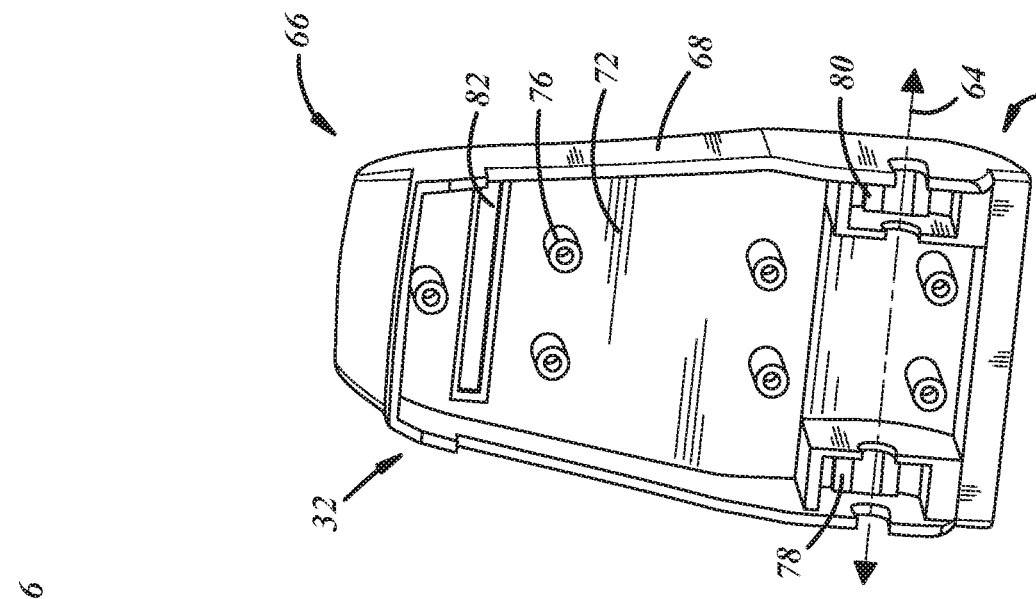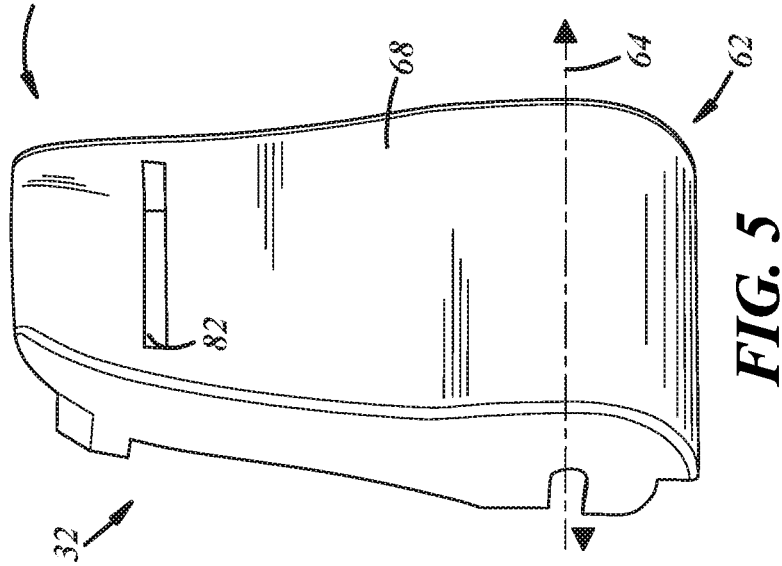

OPERATOR INTERFACE FOR A VEHICLE WHEEL BRAKE CONTROL SYSTEM

BACKGROUND OF THE INVENTION a. Field of the Invention

This invention relates to an operator interface for controlling a wheel brake in a vehicle. In particular, this invention relates to an operator interface in which inertial sensors disposed with a handle moved by the operator generate inertial measurement signals indicative of movement of handle and a controller that is also disposed within the handle generates an operator command signal responsive to the signals to cause application or release of the wheel brake.

b. Background Art

Conventional commercial vehicles include various types of operator interfaces through which the vehicle operator may control emergency/parking and/or service braking in wheel brakes on the vehicle including wheel brakes located on the tractor or power unit and on any trailers or towed units. These operator interfaces may include interfaces that are controlled by the hand of the operator. Conventional hand-controlled interfaces include a handle that can be moved by the operator to indicate a desired action for the wheel brakes. Sensors in these interfaces interpret the movement of the handle and a controller translates signals generated by the sensors into a control signal for the wheel brakes.

Conventional hand-controlled interfaces—and systems and methods for controlling wheel brakes that employ such interfaces—have several drawbacks. The sensors used in conventional hand-controlled interfaces often function based on mechanical contact and are therefore subject to wear and relatively frequent repair or replacement. The sensors are also frequently of a type that expose the sensors and related electronic components to the surrounding environment thereby shortening the life of the sensors and related components. Safety requirements also often require multiple types of sensors for redundancy and the different sensors require complex mechanical assemblies to translate the operator's movement into corresponding, simultaneous mechanical actions required to trigger the different sensors. Conventional hand-controlled interfaces also frequently require substantial assembly time and occupy substantial space within the vehicle. Finally, conventional hand-controlled interfaces are generally difficult to adapt for use by different customers and in different regulatory environments.

The inventors herein have recognized a need for an operator interface for controlling a wheel brake in a vehicle that will minimize and/or eliminate one or more of the above-identified deficiencies.

BRIEF SUMMARY OF THE INVENTION

This invention relates to an operator interface for controlling a wheel brake in a vehicle. In particular, this invention relates to an operator interface in which inertial sensors disposed with a handle moved by the operator generate inertial measurement signals indicative of movement of handle and a controller that is also disposed within the handle generates an operator command signal responsive to the signals to cause application or release of the wheel brake.

An operator interface for a wheel brake control system in a vehicle in accordance with one embodiment includes a handle configured for coupling to a fixed reference frame in the vehicle. The handle is configured for movement relative to the fixed reference frame about a pivot axis between a neutral position and an input position. The interface further includes an inertial sensor disposed within the handle and configured to generate an inertial measurement signal indicative of a value of an inertial measurement associated with movement of the handle and the inertial sensor between the neutral position and the input position. The interface further includes a controller disposed within the handle and configured to generate an operator command signal responsive to the inertial measurement signal. The operator command signal is configured to cause one of application or release of a brake in the vehicle.

An operator interface for a wheel brake control system in a vehicle in accordance with another embodiment includes a handle configured for coupling to a fixed reference frame in the vehicle. The handle is configured for movement relative to the fixed reference frame about a pivot axis between a neutral position and an input position. The interface further includes a first inertial sensor disposed within the handle and configured to generate a first inertial measurement signal indicative of a value of a first inertial measurement associated with movement of the handle and the first inertial sensor between the neutral position and the input position. The interface further includes a second inertial sensor disposed within the handle and configured to generate a second inertial measurement signal indicative of a value of a second inertial measurement associated with movement of the handle and the second inertial sensor between the neutral position and the input position. The interface further includes a controller disposed within the handle and configured to generate an operator command signal responsive to the first and second inertial measurement signals. The operator command signal is configured to cause one of application or release of a brake in the vehicle.

An operator interface for controlling a wheel brake in a vehicle represents an improvement as compared to conventional operator interfaces. In particular, the inventive operator interface employs sensors that do not rely on mechanical contact and therefore do not require frequent repair or replacement. The interface also encloses both the sensors and the controller within the handle thereby preventing exposure to the surrounding environment and improving the life of the interface. The interface can be readily adapted for different customers and in different regulatory environments. For example, the interface can be easily adapted to include magnetic (Hall effect) sensors for redundancy and integrity. The interface is also relatively easy to assemble and requires less space than conventional interfaces and is also less costly than conventional interfaces. Finally, the interface can be adapted to provide visual feedback of operator inputs and/or illumination using lower power components and without light pipes or other mechanisms to transport light.

The foregoing and other aspects, features, details, utilities, and advantages of the present invention will be apparent from reading the following description and claims, and from reviewing the accompanying drawings.

BRIEF DESCRIPTION OF THE DRAWINGS

FIGS. 5-6 are perspective views of a handle of the operator interface of FIGS. 2-3.

FIGS. 7-8 are perspective views of pivot assemblies of the operator interface of FIGS. 2-3.

DETAILED DESCRIPTION OF THE INVENTION

Figure 1:
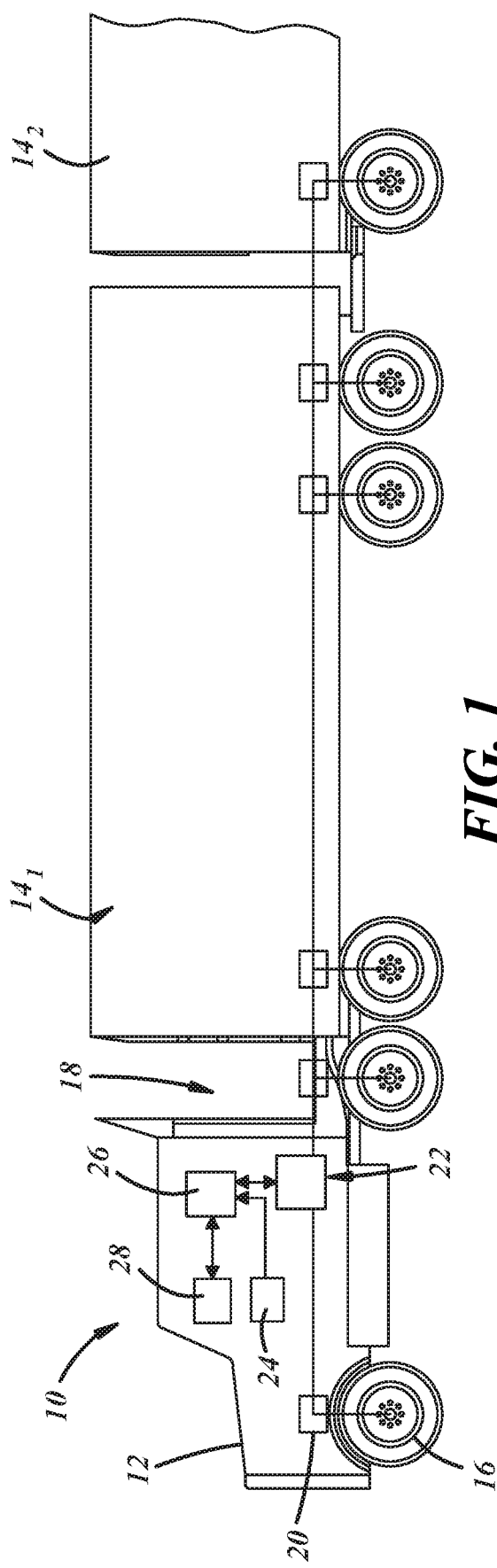
FIG. 1 is a diagrammatic view of a vehicle incorporating an operator interface for a wheel brake control system in accordance with the present teachings.

Referring now to the drawings wherein like reference numerals are used to identify identical components in the various views, FIG. 1 illustrates a vehicle 10. In the illustrated embodiment, vehicle 10 comprises a heavy commercial vehicle and, in particular, a tractor-trailer (also referred to as a semi) containing a tractor or power unit 12 and one or more trailers or towed units $14_N$ ... $14_N$. It should be understood, however, that the inventions disclosed herein may find application on other types of commercial vehicles including, for example, tractors operating without trailers, buses, etc. and may also find application on non-commercial vehicles. Tractor 12 contains a power unit, such as an internal combustion engine, and steering and drive axles each of which support one or more wheels 16 at either end. Trailers $14_1$ ... $14_N$ are provided to store freight and are detachably coupled to tractor 12. Each trailer 14 is supported on one or more trailer axles, each of which may support one or more wheels 16 at either end. Although a pair of trailers 14 are shown in the illustrated embodiment, it should be understood that the number of trailers 14 attached to tractor 12 may vary.

Vehicle 10 includes a braking system 18 configured to brake wheels 16 in order to slow or stop movement of vehicle 10. Braking system 18 may include a plurality of wheel brakes 20, a fluid circuit 22 that supplies fluid pressure to wheel brakes 20, sensors 24 that identify various conditions associated with vehicle 10 and the surrounding environment, and one or more controllers 26. System 18 may further include one or more user or operator interfaces including an operator interface 28 in accordance with the present teachings. Although braking system 18 is described herein as a fluid braking system and, in particular, a pneumatic braking system, it should be understood that the operator interface 28 and the system and method for controlling wheel brakes 20 described hereinbelow could find application in connection with other forms of braking systems.

Wheel brakes 20 are configured to apply a braking force to one or more wheels 16. Brakes 20 may comprise disc brakes in which a carrier supports brake pads on opposite sides of a rotor rotating with the wheel 16 and an actuator causes, responsive to fluid pressure delivered by fluid circuit 22 or another force, movement of a caliper relative to the carrier to move the brake pads into and out of engagement with the rotor. Alternatively, wheel brakes 20 may comprise drum brakes in which an actuator such as a cam or piston causes, responsive to fluid pressure delivered by fluid circuit 22 or another force, movement of one or more brake shoes into engagement with a braking surface in a brake drum rotating with the wheel 16.

Fluid circuit 22 generates fluid pressure within system 18 and controls the delivery of fluid pressure to the actuator of each wheel brake 20. Circuit 22 may include components for generating and storing pressurized fluid including fluid reservoirs, compressors and air dryers and components for routing and delivering fluid pressure to wheel brakes 20 including fluid conduits, glad-hand connectors between the tractor 12 and trailers 14, and a variety of valves including, for example, a foot pedal valve, relay valves, modulator valves, quick release valves, and other valves. An exemplary fluid circuit is disclosed in commonly assigned U.S. patent application Ser. No. 15/943,907, the entire disclosure of which is incorporated herein by reference.

Sensors 24 are provided to identify various conditions associated with vehicle 10 and the surrounding environment that impact the operation of braking system 18. Sensors 24 may include wheel speed sensors that generate signals indicative of the rotational speed of a corresponding wheel 16 and from which controller 26 can determine the speed of vehicle 10 and whether certain wheels 16 are slipping and implement anti-lock braking through control of valves in fluid circuit 22. Sensors 24 may also include pressure sensors that generate signals indicative of the fluid pressure within various fluid conduits in fluid circuit 22. Sensors 24 may also include sensors used to identify other conditions that may impact the operation of braking system 18 including, for example, an engine or transmission speed sensor that generates a signal indicative of the speed of vehicle 10, a steer angle sensor that generates a signal indicative of a steering angle imparted by a vehicle operator to a steering wheel in vehicle 10, a yaw rate sensor that generates a signal indicative of the angular velocity of vehicle 10 about its vertical (yaw) axis, load sensors that generate signals indicative of the forces at various locations on vehicle 10, position sensors that monitor the state of the vehicle ignition, brake pedal or other vehicle components and systems, and interlock sensors (in, for example, the cabin door, driver seat and/or seat belt), used to determine the absence of the vehicle operator for purposes of automatically setting the parking brake when the operator forgets to do so.

Controller 26 controls the operation of fluid circuit 22 in order to control the fluid pressure delivered to wheel brakes 20 and, therefore, the braking force applied to the wheels 16. In this manner, controller 26 may be configured to implement parking/emergency braking and service braking as well as anti-lock braking (ABS), traction control and stability control when required. Controller 26 may also control the outputs of certain user interfaces including brake status indicators. Controller 26 may comprise a programmable microprocessor or microcontroller or may comprise an application specific integrated circuit (ASIC). Controller 26 may include a memory and a central processing unit (CPU). Controller 26 may also include an input/output (I/O) interface including a plurality of input/output pins or terminals through which the controller 26 may receive a plurality of input signals and transmit a plurality of output signals. The input signals may include signals received from sensors 24 and user interfaces such as operator interface 28. The output signals may include signals used to control fluid circuit 22 and signals used to control outputs on user interfaces. Controller 26 may be configured to communicate with components of braking system 18 such as fluid circuit 22, sensors 24 and operator interface 28 over a conventional vehicle communication bus such as a controller area network (CAN) (or another communication medium such as power line communication (PLC)) and to communicate with other vehicle systems over the same or a similar bus including, for example, advanced driver assistance systems such as collision avoidance systems that are configured to implement automated emergency braking of the vehicle wheels 16 under certain conditions. Communications may be carried out over the communications bus in accordance with various industry standard protocols including by not limited to SAE J1939 or SAEJ1922 or using a proprietary protocol. In alternative embodiments, controller 26 may be configured to communicate wirelessly with one or more components of braking system 18 using various industry standard short-range wireless communication protocols such as Bluetooth, Wi-Fi (IEEE 802.11), or Zigbee. Controller 26 may be configured with appropriate programming instructions (i.e., software or a computer program) to implement the control of wheel brakes 20. Although a single controller 26 is shown in the illustrated embodiment, it should be understood that the functions of controller 26 may be divided among multiple controllers located on tractor 12 and trailers 14 that are in communication with one another.

Figure 9:
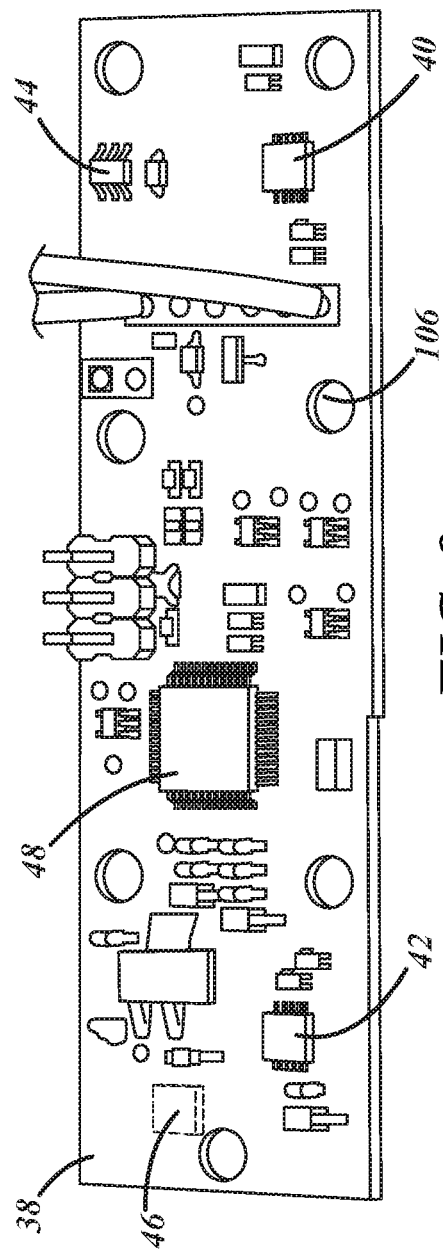
FIG. 9 is a diagrammatic view of electronic components of the operator interface of FIGS. 2-3.

Referring now to FIGS. 2-9, one embodiment of an operator interface 28 in accordance with the present teachings will be described. Interface 28 provides an interface between the vehicle operator and system 18 through which the operator can control certain vehicle braking functions and receive information about vehicle braking. In the illustrated embodiment, interface 28 is provided to control the parking brake function of wheel brakes 20. In particular, interface 28 is used by the vehicle operator to request application of the parking brake (e.g., by exhausting fluid from a brake actuator for wheel brake 20 to allow a spring to apply the parking brake) and release of the parking brake (e.g., by delivering fluid to the brake actuator for wheel brake 20 opposing the spring to release the parking brake). Interface 28 may be mounted within the cabin of tractor 12 of vehicle 10 and, in particular, on the dashboard of vehicle 10. Interface 28 may include a frame 30 (best shown in FIG. 4), a handle 32 (best shown in FIGS. 5-6) and means, such as pivot assemblies 34, 36 (best shown in FIGS. 7-8), for enabling movement (pivoting) of handle 32 relative to frame 30. Interface 28 may further include a system for controlling wheel brakes 20 responsive to movement of the handle 32. Referring to FIG. 9, the system may include various electronic components that may be mounted on a common printed circuit board (PCB) 38 that is mounted on, and disposed within, handle 32. These components may include inertial sensors 40, 42, a Hall effect sensor 44, a light emitter 46 (disposed on an opposite side of PCB relative to sensors 40, 42, 44), and a controller 48.

Figure 4:
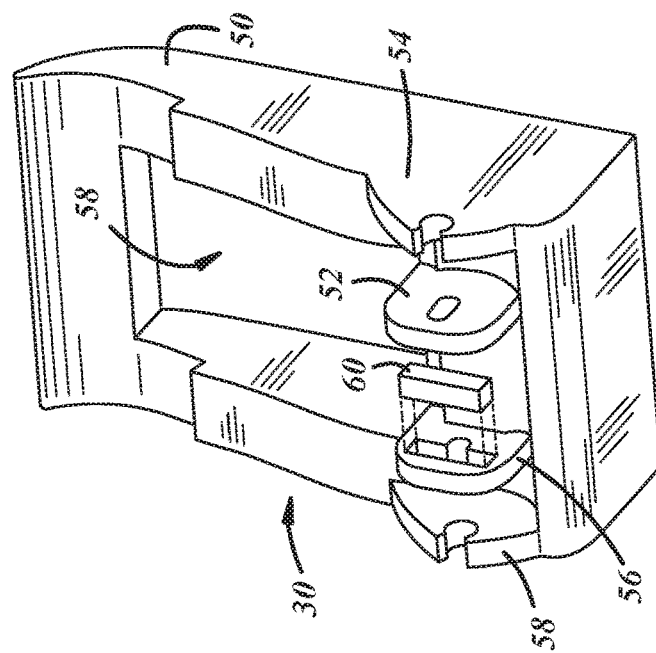
FIG. 4 is a perspective view of a frame of the operator interface of FIGS. 2-3.
Figure 3:
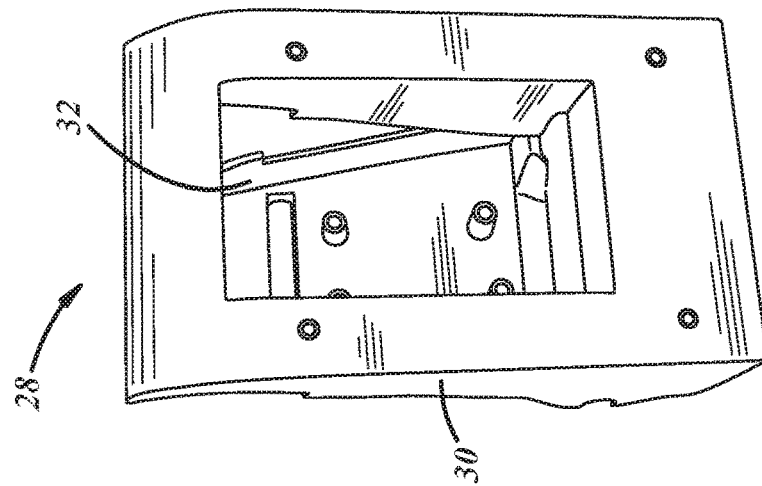
FIGS. 2-3 are perspective view of one embodiment of an operator interface.

Referring to FIG. 4, frame 30 supports handle 32 (as shown in FIGS. 5-6) and pivot assemblies 34, 36 (as shown in FIGS. 7-8) and establishes a fixed reference point from which relative movement of handle 32 can be detected. Frame 30 may be made from polymeric materials. In the illustrated embodiment, frame 30 has a generally rectangular body 50. A rear side of body 50 facing away from handle 32 and the vehicle operator may be fixed to the dashboard or another location in the cabin of tractor 12 using conventional fasteners such as screws, pins or adhesives. A forward side of body 50 facing handle 32 and the vehicle operator defines two pairs of ears 52, 54 and 56, 58 projecting from body 50 and configured for mounting pivot assemblies 34, 36, respectively, therebetween. Body 50 further defines an opening 58 through which wires and/or other electric connectors may access a rear side of handle 32 for connecting board 38 to the vehicle communication bus (and, through the bus, to controller 26 of braking system 18). Although a particular configuration for frame 30 is shown in the illustrated embodiment, it should be understood that the configuration of frame 30 may vary. It should also be understood that frame 30 need not comprise a separate component that is mounted to the dashboard or elsewhere within the cabin of tractor 12, but may instead form a unitary, integral part of the dashboard or another portion of the cabin. Frame 30 may further include a permanent magnet 60 for a purpose described hereinbelow. Magnet 60 may be received within a generally rectangular slot formed in ear 56 of handle 30 such that magnet 60 faces handle 32.

Figure 2:
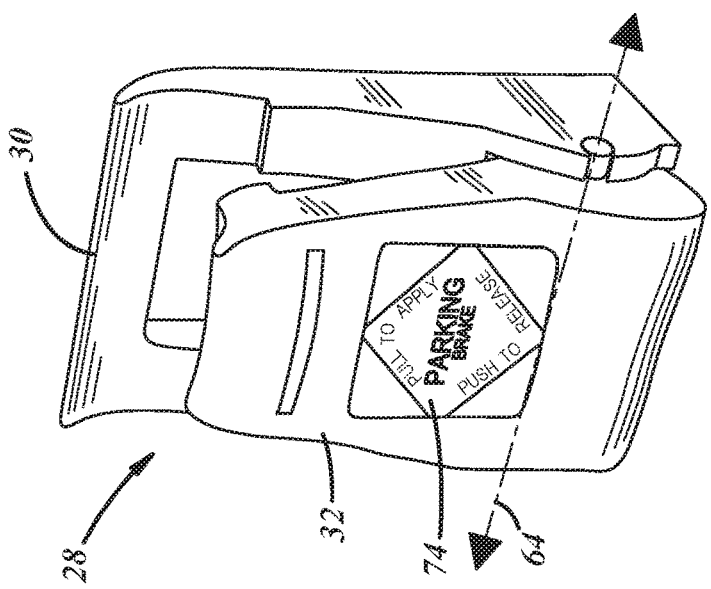

Referring now to FIGS. 5-6, handle 32 provides a means for the operator to input a command to braking system 18 and, particular to the illustrated embodiment, to input a command to apply or release the parking brake of wheel brakes 20. In accordance with one aspect of the present teachings, handle 32 may also provide an environmentally sealed housing for (PCB) 38 and components mounted thereon including inertial sensors 40, 42, Hall effect sensor 44, light emitter 46, and controller 48. Handle 32 may be made from polymeric materials. Handle 32 may be configured with rounded surfaces and edges for operator comfort and ergonomics. One end 62 of handle 32 is configured for pivotally mounting handle 32 to frame 30 such that handle 32 can rotate relative to frame 32 about a pivot axis 64. An opposite end 66 of handle 32 defines a handhold for the operator to push or pull handle 32 to cause rotation of handle 32 about axis 64 relative to frame 30 and pull end 66 of handle 32 away from frame 30 or push end 66 towards frame 30. Handle 32 may include a body 68 that defines a space 72 configured to receive (PCB) 38 and components mounted thereon including inertial sensors 40, 42, Hall effect sensor 44, light emitter 46, and controller 48. Referring to FIG. 2, a forward side of body 68 facing away from frame 30 and towards the vehicle operator may include instructions 74 or other information for the operator. In the illustrated embodiment, the instructions clarify that pulling the handle 32 away from the frame 30 and towards the operator will result in application of the parking brake while pushing the handle 32 towards the frame 30 and away from the operator will result in release of the parking brake. Referring again to FIG. 5, a rear side of body 68 facing towards frame 30 and away from the vehicle operator defines a plurality of mounting posts 76 configured for alignment with corresponding holes formed in PCB 38 for mounting and aligning PCB 38 within handle 32. PCB 38 may be sealed within handle 32 using conventional potting materials. The rear side of body 68 further defines two boxes 78, 80 configured to receive pivot assemblies 34, 36. Two opposing walls in each box 78, 80 define semicircular recesses configured to receive pivot pins on pivot assemblies 34, 36 as discussed in greater detail below. Body 68 may include one or more openings 82 that may house translucent windows through which light may be projected to convey information to the vehicle operator and/or provide illumination as discussed in greater detail below.

Figure 12:
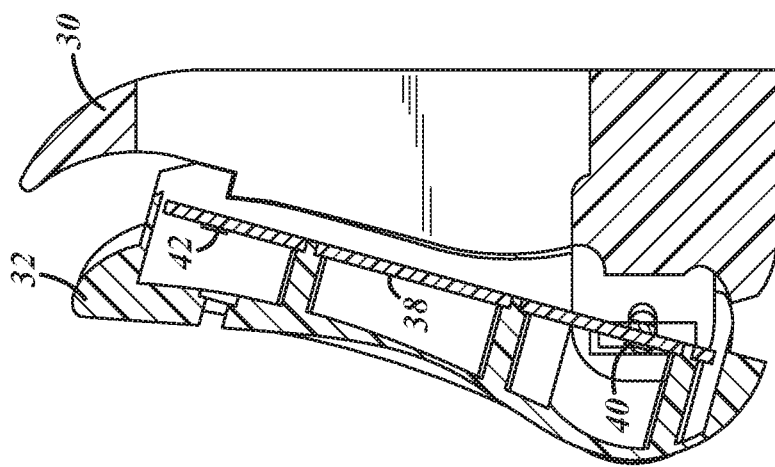
FIG. 12 is a cross-sectional view of the operator interface of FIGS. 2-3 illustrating the handle of the operator interface in another input position.
Figure 11:
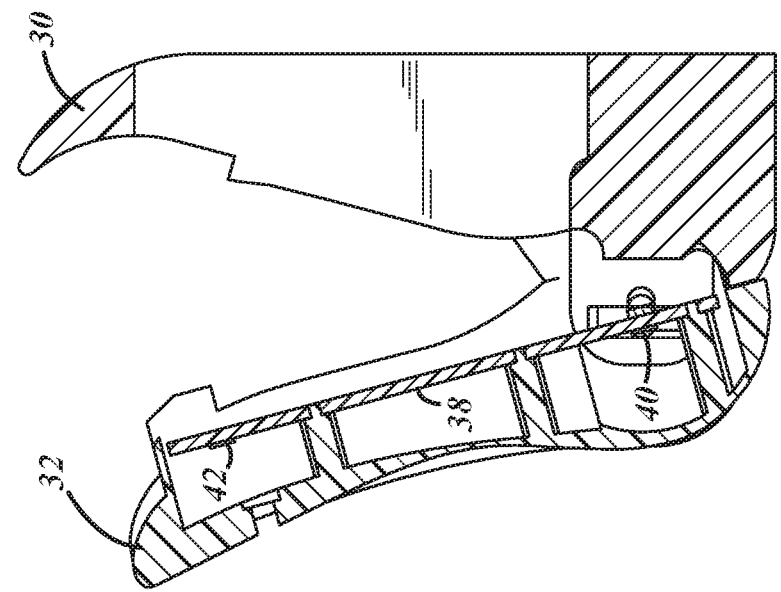
FIG. 11 is a cross-sectional view of the operator interface of FIGS. 2-3 illustrating the handle of the operator interface in one input position.
Figure 10:
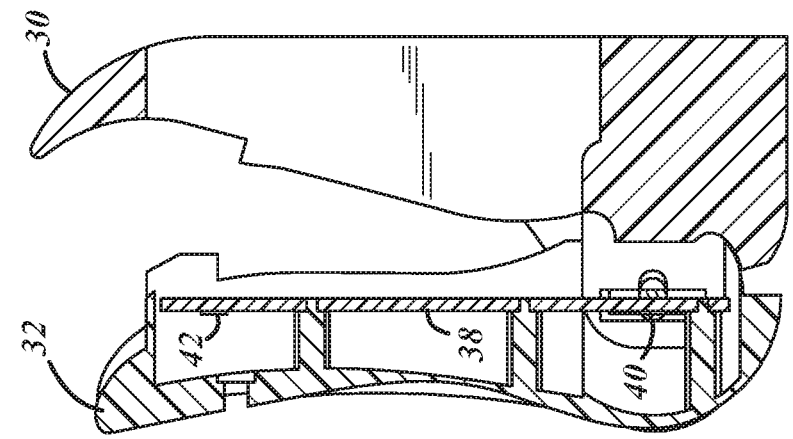
FIG. 10 is a cross-sectional view of the operator interface of FIGS. 2-3 illustrating the handle of the operator interface in a neutral position.

Referring to FIGS. 7-8, pivot assemblies 34, 36 provide a means for mounting handle 32 to frame 30 and enabling movement (pivoting) of handle 32 relative to frame 30 about pivot axis 64. Pivot assemblies 34, 36 also establish a default or neutral position (FIG. 10) for handle 32 relative to frame 30. Each pivot assembly 34, 36 includes a hub 86, 88, respectively, configured to support a torsion spring 90, 92. Each pivot assembly 34, 36, further includes a spring retainer 94, 96, respectively, that is formed proximate at one end of a corresponding hub 86, 88 and extends radially from hub 86, 88 and then axially to limit expansion of the spring 90, 92. Springs 90, 92 are wrapped around hubs 86, 88 and the ends of each spring 90, 92 extend through slots on opposite sides of retainers 94, 96 before engaging ridges formed in boxes 78, 80 in handle 32. Referring to FIG. 10, springs 90, 92, bias handle 32 to a neutral position. Referring to FIGS. 11 and 12 handle 32 may be moved by the vehicle operator from the neutral position shown in FIG. 10 to either of two input positions shown in FIGS. 11 and 12 by applying a force to pull handle 32 (FIG. 11) or push handle 32 (FIG. 12). In response to the applied force, the handle 32 will rotate about the pivot axis 64 in either of two opposing rotations directions to one of the two input positions. When the operator removes the force applied to handle 32, springs 90, 92, return handle 32 to the neutral position shown in FIG. 10. Referring to FIG. 6, the hub 86, 88 and spring retainer 94, 96, of each pivot assembly 34, 36, respectively, are configured to be received within the space 72 defined in handle 32 within boxes 78, 80 of body 68 of handle 32. Referring to FIG. 4, the hub 86, 88 and spring retainer 94, 96, of each pivot assembly 34, 36, respectively, are further configured to be received between corresponding sets of ears 52, 54 and 56, 58 in frame 30. Referring again to FIGS. 7-8, each assembly 34, 36 defines a round pivot pin 98, 100, respectively, that extends in an outboard direction from a corresponding hub 86, 88 through the outboard wall of a corresponding box 78, 80 in body 68 of handle 32 and through a corresponding outboard ear 54, 58 in frame 30. Each assembly 34, 36 further defines a mounting pin 102, 104, respectively, that extends in an inboard direction from a corresponding hub 86, 88 through the inboard wall of a corresponding box 78, 80 in body 68 of handle 32 and through a corresponding inboard ear 52, 56, in frame 30. A portion of each inboard mounting pin 102, 104 extending through boxes 78, 80 in body 68 of handle 32 is round. Another portion of each inboard mounting pin 102, 104 received in ears 52, 56, in frame 30, however, has a shape that that is configured to prevent rotation of pivot assemblies 34, 36 relative to frame 30. In pivot assembly 34, a portion of mounting pin 102 received in ear 52 of frame 30 has an elliptical shape. In pivot assembly 36, a portion of mounting pin 104 received in ear 56 of frame 30 has a D shape. It should be understood, however, that these shapes may vary.

Referring now to FIG. 9, PCB 38 supports and electrically connects inertial sensors 40, 42, Hall effect sensor 44, light emitter 46, controller 48 and other components of a system for controlling wheel brakes 18. PCB 38 may be made from conventional materials. PCB 38 includes one or more holes 106 configured to receive mounting posts 76 projecting from the rear side of body 68 of handle 32 in order to support PCB 38 within handle 32 and position and orient sensors 40, 42, Hall effect sensor 44 and light emitter 46 in predetermined locations with handle 32 and relative to frame 30. Referring to FIG. 6, PCB 38 is retained in place within space 72 in handle 32 on posts 76 without the need for fasteners. As a result, assembly time for interface 28 is reduced relative to conventional interfaces and, further, PCB 38 and the components thereon are environmentally sealed within handle 32.

Figure 13:
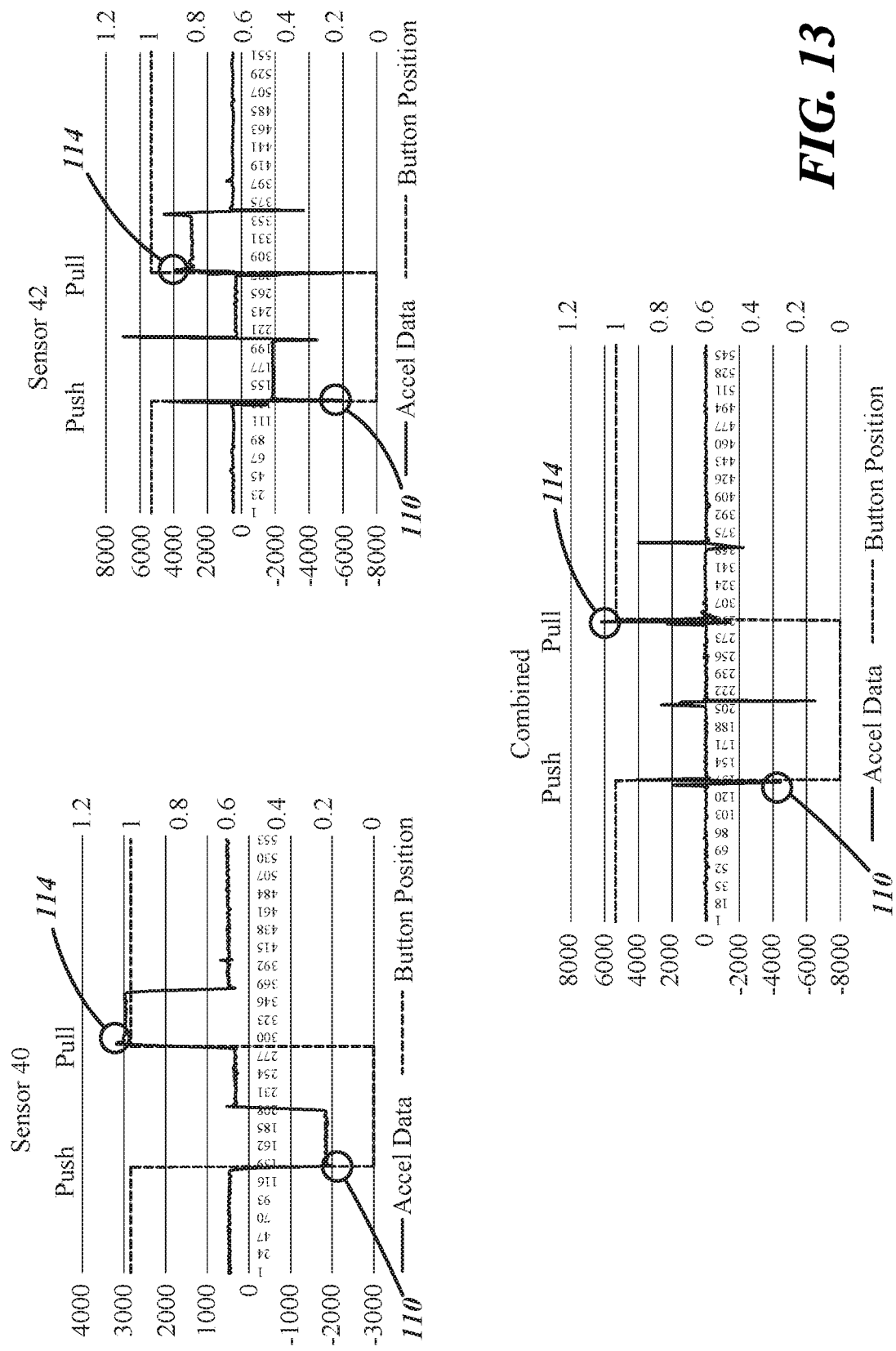
FIG. 13 is a graphical view showing changes in the values of inertial measurements over time generated by inertial sensors in the operator interface responsive to movement of the handle of the interface.

Referring again to FIG. 9, inertial sensors 40, 42 generate inertial measurement signals for controller 48 indicative of values of inertial measurements associated with movement of handle 32 and the sensors 40, 42 between the neutral position (FIG. 10) and input positions (FIGS. 11, 12). Sensor 40 is supported on PCB 38 and positioned within handle 32 such that sensor 40 intersects pivot axis 64. Sensor 42 is also supported on PCB 38 and positioned within handle 32 such that sensor 42 is distant from pivot axis 64. In one embodiment, sensors 40, 42 are disposed proximate opposite ends of PCB 38. Inertial sensors 40, 42 may comprise accelerometers measuring a linear inertial measurement. It should be understood, however, that inertial sensors 40, 42 may alternatively comprise other types of inertial sensors including those configured to measure rotational inertial measurements such as yaw angle sensors and those configured to measure linear and rotational inertial measurements among multiple axes such as inertial measurement units (IMUs). Referring to FIG. 13 (discussed in greater detail below), when handle 32 is "pushed" by the vehicle operator from the neutral position (FIG. 10) to an input position (FIG. 12), inertial sensors 40, 42 generate inertial measurement signals with acceleration profiles in which the magnitude initially decreases. When handle 32 is "pulled" by the vehicle operator from the neutral position (FIG. 10) to another input position (FIG. 11), inertial sensors 40, 42, generate inertial measurement signals with different acceleration profiles in which the magnitude initially increases. In the illustrated embodiment, interface 28 includes multiple inertial sensors 40, 42. Multiple inertial sensors are useful in filtering out the impact of inertial movements unrelated to movement of handle 32 (e.g., vehicle acceleration). It should be understood, however, that a single inertial sensor could alternatively be used in some embodiments. A single inertial sensor may, for example, provide sufficient information to controller 48 in certain applications where vehicle 10, or at least interface 28, is relatively stationary. A single inertial sensor may also be used in combination with readings from another inertial sensor located elsewhere within vehicle 10 separate from interface 28.

Hall effect sensor 44 generates a position signal indicative of the position of handle 32 and can be used by controller 48 as a separate indicator of the position of handle 32 relative to reference frame 30 and/or to verify the position indicated by inertial sensors 40, 42. The use of multiple different sensors 40, 42, 44 allows interface 28 to be scaled for use in a variety of different applications and regulatory environments. Sensor 44 is mounted on PCB 38 and therefore disposed within space 72 in handle 32 upon assembly. Sensor 44 may be disposed proximate pivot axis 64 upon assembly. Sensor 44 generates a position signal indicative of the position of handle 32 responsive to the strength of a magnetic field at a particular position that is generated by magnet 60, in frame 30. The signal is output by sensor 44 to controller 48. Although interface 28 uses a Hall effect sensor 44 as a position sensor in the illustrated embodiment, it should be understood that other forms of position sensors could be used including inductive sensors or optic sensors.

Light emitter 46 may be used to provide an indication of the state of the parking brake. Light emitter 46 may comprise one or more light emitting diodes (LEDs). Light emitter 46 is mounted on PCB 38 and is therefore disposed with space 72 in handle 32 upon assembly. Upon assembly, light emitter 46 is aligned with opening 82 in body 68 of handle 32 and projects light towards the vehicle operator through a translucent window in the opening 82. Light emitter 46 may convey information to the vehicle operator regarding the state of the parking brake through differences in color, intensity, number of lights or in the pattern activation of the lights. In one embodiment, light emitter projects a light of one color (e.g., red) when the parking brake is applied and light of another color (e.g., green) when the parking brake is released. In addition to providing information about the status of the parking brake, light emitters could be located on board to provide illumination (e.g., backlighting) for handle 32 to make it easier for the vehicle operator to locate and/or read information on the face of handle 32. In accordance with one aspect of the present teachings, the ability of interface 28 to generate light using components housed entirely within handle 32 avoids the need for light pipes to deliver light from remote sources and mechanical interfaces that inhibit environmental sealing. Although the illustrated embodiment includes a light emitter 46 for use in conveying information in the illustrated embodiment, it should be understood that alternative embodiments may include other devices to convey information to the vehicle operator including sound emitters, such as a speaker, where information is conveyed through differences in the type of sound generated, differences in volume and differences in the pattern of sounds or haptic feedback devices in which information is conveyed through differences in the intensity or pattern of haptic feedback to the vehicle operator.

Controller 48 generates operator command signals, and provides those signals to controller 26 in braking system 18, responsive to movement of handle 32 by the vehicle operator and the resulting signals generated by inertial sensors 40, 42 and Hall effect sensor 44. Controller 48 may also control the output of light emitter 46 and other feedback systems for the vehicle operator. Controller 48 is mounted on PCB 38 and is therefore disposed within space 72 in handle 32 upon assembly. Controller 48 may comprise a programmable microprocessor or microcontroller or may comprise an application specific integrated circuit (ASIC). Controller 48 may include a memory and a central processing unit (CPU). Controller 48 may also include an input/output (I/O) interface including a plurality of input/output pins or terminals through which the controller 48 may receive a plurality of input signals and transmit a plurality of output signals. The input signals may include signals received from sensors 40, 42, 44. The output signals may include operator command signals transmitted to controller 26 and signals used to control light emitter 46. Controller 48 may be configured to communicate with controller 26 over the vehicle communication bus or power line. Alternatively, controller 48 may be configured to communicate with controller 26 wirelessly using conventional short-range wireless communication protocols such as Bluetooth, Wi-Fi (IEEE 802.11), or Zigbee. In accordance with the present teachings, controller 48 may be configured with appropriate programming instructions (i.e., software or a computer program) to implement a method for controlling wheel brakes 20. The instructions or computer program may be encoded on a non-transitory computer storage medium such as a memory within, or accessible by, controller 48.

Figure 14:
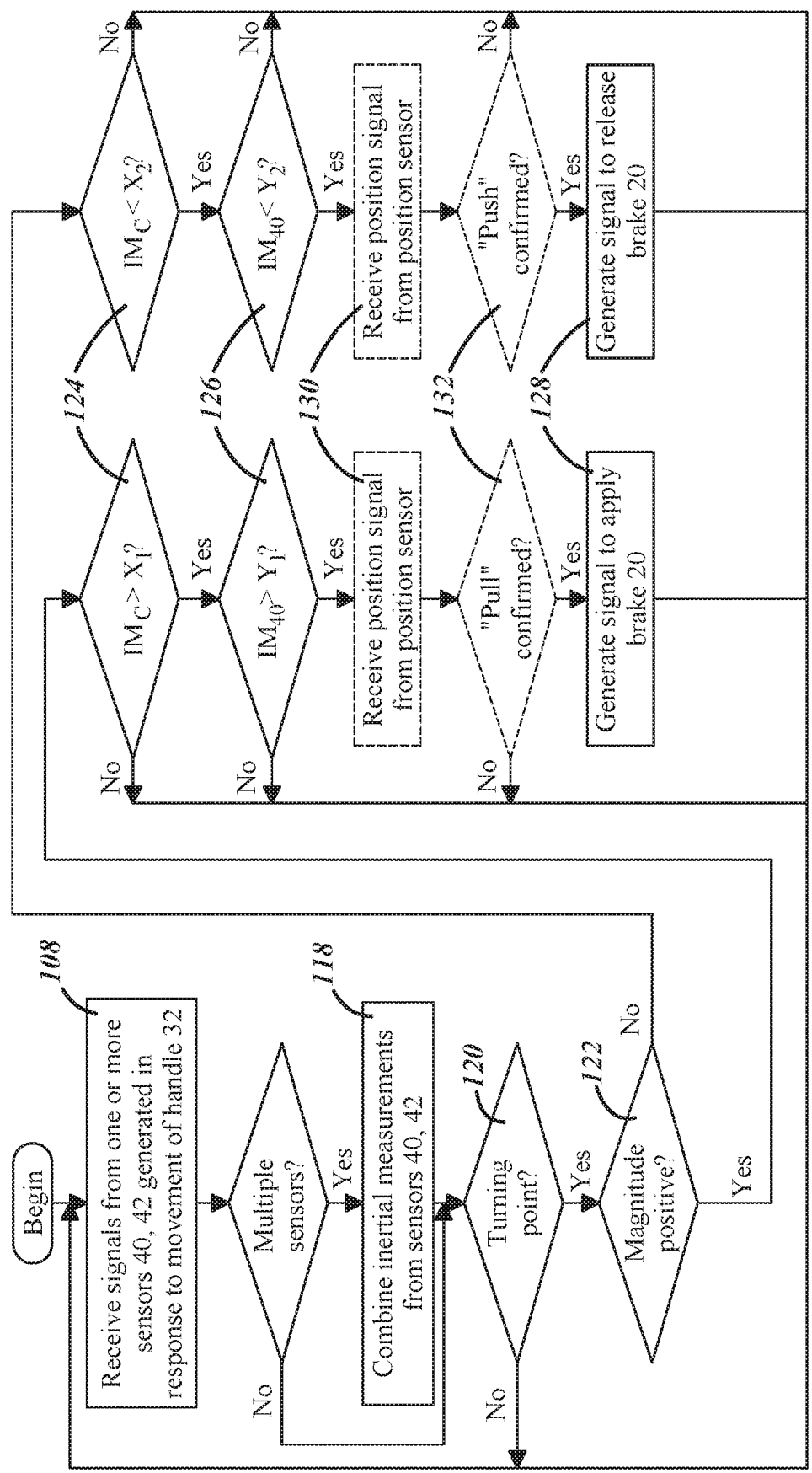
FIG. 14 is a flowchart illustrating one embodiment of a method for controlling a wheel brake in a vehicle.

Referring to FIG. 14, a method for controlling wheel brakes 20 may begin with the step 108 of receiving one or more inertial measurement signals generated in response to movement of handle 32. The inertial measurement signals may be generated by inertial sensors 40, 42 and are indicative of the value of inertial measurements associated with movement of handle 32 between the neutral position (FIG. 10) and an input position (FIG. 11 or 12). As discussed above, the vehicle operator applies a force to handle 32 to "pull" or "push" handle 32 and move handle 32 from the neutral position (FIG. 10) to an input position (FIG. 11 or 12) against the spring force applied by springs 90, 92 biasing handle 32 to the neutral position. The movement is ultimately interpreted as a command to apply or release the wheel brakes 20 (in the illustrated embodiment, to apply or release the parking brake in wheel brakes 20). Movement of handle 32 results in a change in value in the inertial measurements measured by inertial sensors 40, 42 which is reflected in the inertial measurement signals generated by sensors 40, 42 and provided to controller 48. Referring to FIG. 13, when the vehicle operator "pushes" the handle 32, the inertial measurement signals generated by sensors 40, 42 each produce an inertial measurement profile (an acceleration profile in the case of accelerometers) in which the magnitude of the inertial measurement decreases until reaching a peak or turning point 110 after which the magnitude begins to increase. Once the vehicle operator releases handle 32, springs 90, 92 force handle 32 to move in the opposite direction to return to the neutral position. When the vehicle operator "pulls" handle 32, the inertial measurement signals generated by sensors 40, 42 each produce an inertial measurement profile in which the magnitude of the inertial measurement moves in an opposite direction relative to a "push"-initially increasing until a turning point 114 after which the magnitude begins to decrease. Once the vehicle operator release handle 32, springs 90, 92 force handle 32 to move in the opposite direction to return to the neutral position.

Referring again to FIG. 14, in certain embodiments a single inertial sensor 40 or 42 could be used in the inventive method as discussed above. Where multiple inertial sensors 40, 42 are used, however, the method may continue with the step 118 of combining the inertial measurements indicated by sensors 40, 42 to establish a combined inertial measurement of the two inertial measurements before proceeding to subsequent steps. In one embodiment, controller 48 combines the values by subtracting the value of the inertial measurement output by inertial sensor 40 from the value of the inertial measurement output by inertial sensor 42 resulting in the inertial measurement profiles shown at the bottom of FIG. 13. In another embodiment, controller 48 may average the two values.

The method may continue with the step 120 of identifying a turning point in a rate of change of the value of a single inertial measurement or of the combined value of a combined inertial measurement. Referring again to FIG. 13, the magnitude of the value of the individual inertial measurements and combined inertial measurements will initially decrease (when the handle 32 is "pushed") or increase (when the handle 32 is "pulled") and will thereafter increase (when the handle 32 is pushed") or decrease (when the handle 32 is "pulled") as the handle 32 reaches its input position (FIG. 11 or FIG. 12). Controller 48 may monitor the value of the individual inertial measurements or combined inertial measurements to identify the turning points 110, 114 where the rate of change moves from negative to positive ("push") or from positive to negative ("pull"), respectively. In this manner, controller 48 identifies a potential commanded input from the vehicle operator. In one embodiment, controller 48 attempts to identify a turning point 110 or 114 in the rate of change of the value of the inertial measurement measured by sensor 40.

Referring again to FIG. 14, the method may continue with the step 122 of determining a sign of the value of the individual inertial measurement or the sign of the combined value of the combined inertial measurement at the turning point 110 or 114. Once the turning point 110 or 114 is identified, controller 48 may identify the magnitude of the individual inertial measurement or combined inertial measurement at the turning point and determine whether the magnitude is positive of negative. In the illustrated embodiment, a positive magnitude is indicative of a potential "pull" input (or request to apply the wheel brakes 20) by the vehicle operator while a negative magnitude is indicative of a potential "push" input by the vehicle operator (or request to release the wheel brakes 20).

Once the sign of the of the individual or combined value is determined, the method may continue with the step of establishing predetermined conditions under which controller 26 will render a final determination as to whether the vehicle operator has entered a command to apply or release the wheel brakes 20. As discussed below, controller 48 will make a final determination based on whether the values of one or more of the inertial measurements at the turning point 110 or 114 meet predetermined conditions. The conditions for the comparison will differ, however, based on whether controller 48 is confirming a potential "pull" input (or request to apply the wheel brakes 20) or a potential "push" input (or request to release the wheel brakes 20). Therefore, controller 48 may establish the conditions responsive to the sign of the value or combined value obtained in step 122. In some embodiments, the predetermined condition or conditions may be whether the values of one or more of the inertial measurements and/or the combined inertial measurement at the turning point 110, 114 meets or exceed predetermined threshold values. In other embodiments, the predetermined condition or conditions may be whether the values of one or more of the inertial measurements and/or the combined inertial measurement at the turning point 110, 114 falls within a predetermined range of values. The appropriate predetermined thresholds and ranges may be determined empirically through routine experimentation. In yet another embodiment, the predetermined condition or conditions may be whether the values of one or more of the inertial measurements and/or the combined inertial measurement at the turning point 110, 114 is greater than or less than a value for a corresponding inertial measurement taken at a point in time before the turning point 110, 114. In some embodiments (like the one illustrated in FIG. 14), more than one of these conditions may be required to be met before a determination is made as to whether the operator has entered a command to apply or release the wheel brakes 20.

Referring again to FIG. 14, in the illustrated embodiment the method may continue with the steps 124, 126 in which values for the combined inertial measurement and the inertial measurement obtained by sensor 40, respectively, at the turning point 110 or 114 are compared to predetermined threshold values. In embodiments where a single inertial sensor 40 or 42 is employed, step 124 will be omitted. In one embodiment in which controller 48 seeks to confirm a "pull" input, controller 48 determines whether the value $IM_C$ for the combined inertial measurement at the turning point 114 is greater than a predetermined threshold $X_1$ and whether the value $IM_{40}$ for the inertial measurement by sensor 40 at the turning point 114 is greater than the predetermined threshold $X_2$. In one embodiment in which controller 48 seeks to confirm a "push" input, controller 48 determines whether the value $IM_C$ for the combined inertial measurement at the turning point 110 is less than a predetermined threshold $Y_1$ and whether the value $IM_{40}$ for the inertial measurement by sensor 40 at the turning point 110 is less than the predetermined threshold $Y_2$.

If controller 48 is unable to verify one or more of the conditions in steps 124, 126, controller 48 does not generate and transmit an operator command signal to controller 26. If controller 48 verifies the condition(s) in steps 124, 126, the method may continue with the step 128 of generating an operator command signal configured to cause application or release of the wheel brake 20 depending upon whether controller 48 has confirmed a "pull" input (or request to apply the wheel brakes 20) or a "push" input (or request to release the wheel brakes 20). Controller 48 may generate and transmit this signal to controller 26 of braking system 18 which may, in response, generate appropriate control signals to fluid circuit 22 to cause application or release of wheel brakes 20.

As discussed above, certain applications or regulatory environments may require additional confirmation of the operator command through another sensing modality. Therefore, in certain embodiments, step 128 may be preceded by steps 130, 132. In step 130, controller 48 receives a position signal generated by a position sensor within handle 32 such as Hall effect sensor 44 in the illustrated embodiment. The position signal is indicative of a position of handle 32 between the neutral position (FIG. 10) and the input positions (FIGS. 11 and 12). In step 132, controller determines whether the position signal confirms the "pull" or "push" input identified based on the outputs of inertial sensors 40, 42. If the position signal does not confirm the input, controller 48 does not generate and transmit an operator command signal to controller 26. If the position signal confirms the input, controller 48 proceeds to step 128.

An operator interface 28 for controlling a wheel brake 20 in a vehicle 10 represents an improvement as compared to conventional operator interfaces. In particular, the inventive operator interface 28 employs sensors that do not rely on mechanical contact and therefore do not require frequent repair or replacement. The interface 28 also encloses both the sensors and the controller within the handle thereby preventing exposure to the surrounding environment and improving the life of the interface. The interface 28 can be readily adapted for different customers and in different regulatory environments. For example, the interface 28 can be easily adapted to include magnetic (Hall effect) sensors for redundancy and integrity. The interface 28 is also relatively easy to assemble and requires less space than conventional interfaces and is also less costly than conventional interfaces. Finally, the interface 28 can be adapted to provide visual feedback of operator inputs and/or illumination using lower power components and without light pipes or other mechanisms to transport light.

While the invention has been shown and described with reference to one or more particular embodiments thereof, it will be understood by those of skill in the art that various changes and modifications can be made without departing from the spirit and scope of the invention.

What is claimed is:

1. An operator interface for a wheel brake control system in a vehicle, comprising:
    a handle configured for coupling to a fixed reference frame in the vehicle, the handle configured for movement relative to the fixed reference frame about a pivot axis between a neutral position and a first input position;

an inertial sensor disposed within the handle and configured to generate an inertial measurement signal indicative of a value of an inertial measurement associated with movement of the handle and the inertial sensor between the neutral position and the first input position; and, a controller disposed within the handle and configured to generate a first operator command signal responsive to the inertial measurement signal, the first operator command signal configured to cause one of application or release of a brake in the vehicle.

2. The operator interface of claim 1 wherein the pivot axis intersects the inertial sensor.

3. The operator interface of claim 1 wherein the inertial sensor is distant from the pivot axis.

4. The operator interface of claim 1 wherein the inertial sensor comprises an accelerometer.

5. The operator interface of claim 1 wherein the controller is configured, in generating the first operator command signal, to:

identify a turning point in a rate of change of the value of the inertial measurement indicated by the inertial measurement signal; and, generate the first operator command signal when a first value of the inertial measurement at the tuning point meets a predetermined condition.

6. The operator interface of claim 5 wherein the controller is further configured, in generating the first operator command signal, to:

determine a sign of the value of the inertial measurement at the turning point; and establish the predetermined condition responsive to the sign of the value of the inertial measurement at the turning point.

7. The operator interface of claim 1 wherein the handle is further configured for movement relative to the fixed reference frame about the pivot axis between the neutral position and a second input position, the inertial measurement is associated with movement of the housing and the inertial sensor between the neutral position and the first and second input positions and the controller is further configured to generate a second operator command signal responsive to the inertial measurement signal, the second operator command signal configured to cause the other of application or release of the brake in the vehicle.

8. The operator interface of claim 7 wherein the handle is configured for movement from the neutral position to the first input position in a first direction about the pivot axis and is configured for movement from the neutral position to the second input position in a second direction, opposite the first direction, about the pivot axis.

9. The operator interface of claim 7 wherein the controller is configured, in generating the first and second operator command signals, to:

identify a turning point in a rate of change of the value of the inertial measurement indicated by the inertial measurement signal;

determine a sign of the value of the inertial measurement at the turning point;

establish a predetermined condition responsive to the sign of the value of the inertial measurement at the turning point; and, generate one of the first operator command signal and the second operator command signal, dependent on the sign of the value of the inertial measurement at the turning point, when the first value meets the predetermined condition.

10. The operator interface of claim 1 wherein inertial sensor and the controller are environmentally sealed within the handle.

11. The operator interface of claim 1, further comprising a position sensor disposed within the handle and configured to generate a position signal indicative of a position of the handle, the controller configured to generate the first operator command signal responsive to the first inertial measurement signal and the position signal.

12. The operator interface of claim 11 wherein the position sensor comprises a Hall effect sensor that generates the position signal responsive to a magnetic field strength, at the position of the handle, of a magnetic field generated by a magnet disposed in the fixed reference frame.

13. The operator interface of claim 1 wherein the handle includes a translucent window and further comprising a light emitter disposed within the handle and configured to generate light through the translucent window indicative of a state of the brake.

14. An operator interface for a vehicle brake control system, comprising:

a handle configured for coupling to a fixed reference frame in the vehicle, the handle configured for movement relative to the fixed reference frame about a pivot axis between a neutral position and a first input position;

a first inertial sensor disposed within the handle and configured to generate a first inertial measurement signal indicative of a value of a first inertial measurement associated with movement of the handle and the first inertial sensor between the neutral position and the first input position;

a second inertial sensor disposed within the handle and configured to generate a second inertial measurement signal indicative of a value of a second inertial measurement associated with movement of the handle and the second inertial sensor between the neutral position and the first input position; and, a controller disposed within the handle and configured to generate a first operator command signal responsive to the first and second inertial measurement signals, the first operator command signal configured to cause one of application or release of a brake in the vehicle.

15. The operator interface of claim 14 wherein the pivot axis intersects the first inertial sensor.

16. The operator interface of claim 15 wherein the second inertial sensor is distant from the pivot axis.

17. The operator interface of claim 14 wherein the first and second inertial sensors comprise accelerometers.

18. The operator interface of claim 14 wherein the controller is configured, in generating the first operator command signal, to:

identify a turning point in a rate of change of a value of one of the first inertial measurement indicated by the first inertial measurement signal and the second inertial measurement indicated the second inertial measurement signal;

combine the first inertial measurement indicated by the first inertial measurement signal and the second inertial measurement indicated by the second inertial measurement signal to establish a combined inertial measurement of the first and second inertial measurements; and, generate the first operator command signal when a value for the combined inertial measurement at the turning point meets a first predetermined condition and the value of the one of the first inertial measurement and the second inertial measurement at the turning point meets a second predetermined condition.

19. The operator interface of claim 18 wherein the controller is further configured, in generating the first operator command signal, to:
   determine a sign of the value of the one of the first inertial measurement and the second inertial measurement at the turning point; and
   establish the first and second predetermined conditions responsive to the sign of the value of the one of the first inertial measurement and the second inertial measurement at the turning point.

20. The operator interface of claim 14 wherein the handle is further configured for movement relative to the fixed reference frame about the pivot axis between the neutral position and a second input position, the first inertial measurement is associated with movement of the housing and the first inertial sensor between the neutral position and the first and second input positions, the second inertial measurement is associated with movement of the housing and second inertial sensor between the neutral position and the first and second input positions, and the controller is further configured to generate a second operator command signal responsive to the first and second inertial measurement signals, the second operator command signal configured to cause the other of application or release of the brake in the vehicle.

21. The operator interface of claim 20 wherein the handle is configured for movement from the neutral position to the first input position in a first direction about the pivot axis and is configured for movement from the neutral position to the second input position in a second direction, opposite the first direction, about the pivot axis.

22. The operator interface of claim 20 wherein the controller is configured, in generating the first and second operator command signals, to:
   identify a turning point in a rate of change of a value of one of the first inertial measurement indicated by the first inertial measurement signal and the second inertial measurement indicated the second inertial measurement signal;
   determine a sign of the value of the one of the first inertial measurement and the second inertial measurement at the turning point
   establish a first predetermined condition and a second predetermined condition responsive to the sign of the value of the one of the first inertial measurement and the second inertial measurement at the turning point;
   combine the value of the first inertial measurement indicated by the first inertial measurement signal and the value of the second inertial measurement indicated by the second inertial measurement signal to establish a combined value for a combined inertial measurement of the first and second inertial measurements; and,
   generate the first operator command signal when a value for the combined inertial measurement at the turning point meets the first predetermined condition and the value of the one of the first inertial measurement and the second inertial measurement at the turning point meets the second predetermined condition.

23. The operator interface of claim 14 wherein first and second inertial sensors and the controller are environmentally sealed within the handle.

24. The operator interface of claim 14, further comprising a position sensor disposed within the handle and configured to generate a position signal indicative of a position of the handle, the controller configured to generate the first operator command signal responsive to the first and second inertial measurement signals and the position signal.

25. The operator interface of claim 24 wherein the position sensor comprises a Hall effect sensor that generates the position signal responsive to a magnetic field strength, at the position of the handle, of a magnetic field generated by a magnet disposed in the fixed reference frame.

26. The operator interface of claim 14 wherein the handle includes a translucent window and further comprising a light emitter disposed within the handle and configured to generate light through the translucent window of the handle indicative of a state of the brake.

* * * * *